United States Patent [19]
Hassan et al.

[11] Patent Number: 5,974,376
[45] Date of Patent: *Oct. 26, 1999

[54] METHOD FOR TRANSMITTING MULTIRESOLUTION AUDIO SIGNALS IN A RADIO FREQUENCY COMMUNICATION SYSTEM AS DETERMINED UPON REQUEST BY THE CODE-RATE SELECTOR

[75] Inventors: Amer Hassan, Cary; David G. Matthews, Raleigh, both of N.C.

[73] Assignee: Ericsson, Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/728,566

[22] Filed: Oct. 10, 1996

[51] Int. Cl.$^6$ .............................. H04Q 7/38; G10L 9/18
[52] U.S. Cl. ......................... 704/220; 704/203; 704/266; 704/269
[58] Field of Search .................................... 704/203, 220, 704/266, 269

[56] References Cited

U.S. PATENT DOCUMENTS

| | | | |
|---|---|---|---|
| 4,414,580 | 11/1983 | Johnsen et al. | 358/261.3 |
| 4,654,484 | 3/1987 | Reiffel et al. | 348/17 |
| 4,870,497 | 9/1989 | Chamzas et al. | 358/426 |
| 5,412,741 | 5/1995 | Shapiro | 382/232 |
| 5,426,513 | 6/1995 | Scorse et al. | 358/433 |
| 5,467,132 | 11/1995 | Fazel et al. | 348/390 |
| 5,535,239 | 7/1996 | Padovani et al. | 370/209 |
| 5,546,477 | 8/1996 | Knowles et al. | 382/242 |
| 5,781,881 | 7/1998 | Stegmann | 704/211 |
| 5,886,276 | 3/1999 | Levine et al. | 84/603 |

FOREIGN PATENT DOCUMENTS

0544463A2 of 1992  European Pat. Off. ............... 375/286

OTHER PUBLICATIONS

Olivier Rioul and Martin Vetterli, "Wavelets and Signal Processing," IEEE Signal Processing magazine, pp. 14–37, Oct. 1991.

*Primary Examiner*—David R. Hudspeth
*Assistant Examiner*—Tālivaldis Ivars Šmits
*Attorney, Agent, or Firm*—Coats & Bennett, P.L.L.C.

[57] ABSTRACT

The present invention relates to a method for transmitting multiresolution audio signals via wireless devices in a radio frequency communication system wherein audio signals are decomposed into levels of resolution. The audio signal is decomposed into levels including a base signal at a base transmission rate and one or more signal details and input into a code rate selector, controlled by either party to the communication. The base signal represents the coarsest resolution or quality of the signal. Each signal detail, when added to the base signal, improves the resolution of the signal by increasing the detail and the transmission rate. An audio receiving unit transmits a request for audio transmission to the audio transmitting unit. In response to the initial request, the base signal is transmitted to the audio receiving unit. If the base signal is insufficient, the sound quality can be increased incrementally by sending further requests to transmit additional signal detail from the code rate selector. The additional signal detail is then recombined with the base signal at the audio transmitting unit to provide a higher level of sound quality to the signal. The higher quality audio signal is then transmitted to the audio receiving unit.

20 Claims, 5 Drawing Sheets

METHOD FOR TRANSMITTING MULTIRESOLUTION AUDIO SIGNALS IN A RADIO FREQUENCY COMMUNICATION SYSTEM AS DETERMINED UPON REQUEST BY THE CODE-RATE SELECTOR

FIELD OF THE INVENTION

The present invention relates to wireless communication systems and more particularly to a method for transmitting multiresolution audio signals via wireless devices in a radio frequency communication system.

BACKGROUND OF THE INVENTION

In current technology, a radio frequency communication system following a specific standard is governed by a maximum audio transmission rate. A typical maximum audio transmission rate is on the order of 64,000 bits per second (64 kbps) which corresponds to high fidelity audio. However, transmission of audio signals at full rate requires a significant amount of resources in terms of power and spectrum. Thus, full rate audio transmission is not cost-efficient for applications such as mobile cellular communications, but is more suited to wireline communication systems or high-power directive microwave links where these parameters are not as critical.

In addition, for mobile cellular communication systems, the predominant use is for voice communication such as conversations between parties via radiotelephones. For simple voice communication, high fidelity audio is not critical for efficient communication. The human ear is capable of discerning audio signals at much lower resolution. In these instances, audio transmission rates on the order of 3,200 bits per second (3.2 kbps) may provide sufficient audio quality for the parties to the conversation. Communication at this level results in significant conservation of power and spectrum resources for the communication system. However, there may be instances where high fidelity audio is required, for example, where a musical recording must be transmitted. The problems lies in that the audio transmission rate is determined when the audio signal is coded and the coding device typically is set to code the signal at a single predetermined rate. Thus, there exists a trade-off between conservation of power and spectrum resources at a low transmission rate and providing an acceptable audio resolution to the system user at a high transmission rate. Therefore, a system is needed to eliminate this trade-off whereby the resolution or the quality of an audio signal transmitted via radio frequency communication systems can be varied by the users to meet specific situations.

SUMMARY OF THE INVENTION

The present invention relates to a method for transmitting multiresolution audio signals via wireless devices in a radio frequency communication system.

This method uses wavelet techniques to decompose an audio signal. The decomposed original signal includes a base signal, representing the lowest resolution of the original signal, and one or more signal details which, when added to the base signal, provide increasing levels of resolution. The maximum number of levels of resolution into which the audio is decomposed may be determined by the resolution limits of the audio transmitting unit or by artificial limitation on the audio transmitting unit by the transmitting party.

After establishing a communication channel, the base signal is transmitted to the audio receiving unit. The audio receiving unit includes means for incrementing the resolution of the signal by sending requests for additional signal detail to the audio transmitting unit. Additional signal details are then combined with the previous level of resolution, again using wavelet techniques, to create an audio signal of higher resolution. The higher resolution audio signal is then transmitted to the audio receiving unit. The audio receiving unit may send multiple requests for additional signal details. Each time, the additional signal detail is combined with the previous level of resolution to provide a new audio signal of higher resolution.

One advantage to decomposing the audio signal into incremental levels of resolution is that only the level of resolution necessary to provide agreeable quality and intelligibility of the audio signal is transmitted. For example, audio signals such as an ordinary voice conversation may only require an intermediate or low level of audio signal resolution to be intelligible. Bandwidth and power are saved by transmitting a lower resolution. Some audio, such as musical works, may require high resolution to be effective for the purposes of the party receiving the communication. In such cases, the receiving party can request higher levels of resolution.

The required level of resolution can be determined by either party to the communication or by the resolution limits of the communication devices. Representative applications of this concept include transmission of audio signals from hand-held cellular radio devices or from compact disc players connected via an interface to a hand-held cellular radio devices. Therefore, it can be seen that the main advantage of this method will be to lessen the power and spectrum requirements of radio frequency communication system while allowing the users of the devices to determine the optimal level of resolution necessary to suit their needs.

DETAILED DESCRIPTION OF THE INVENTION

Figure 1:
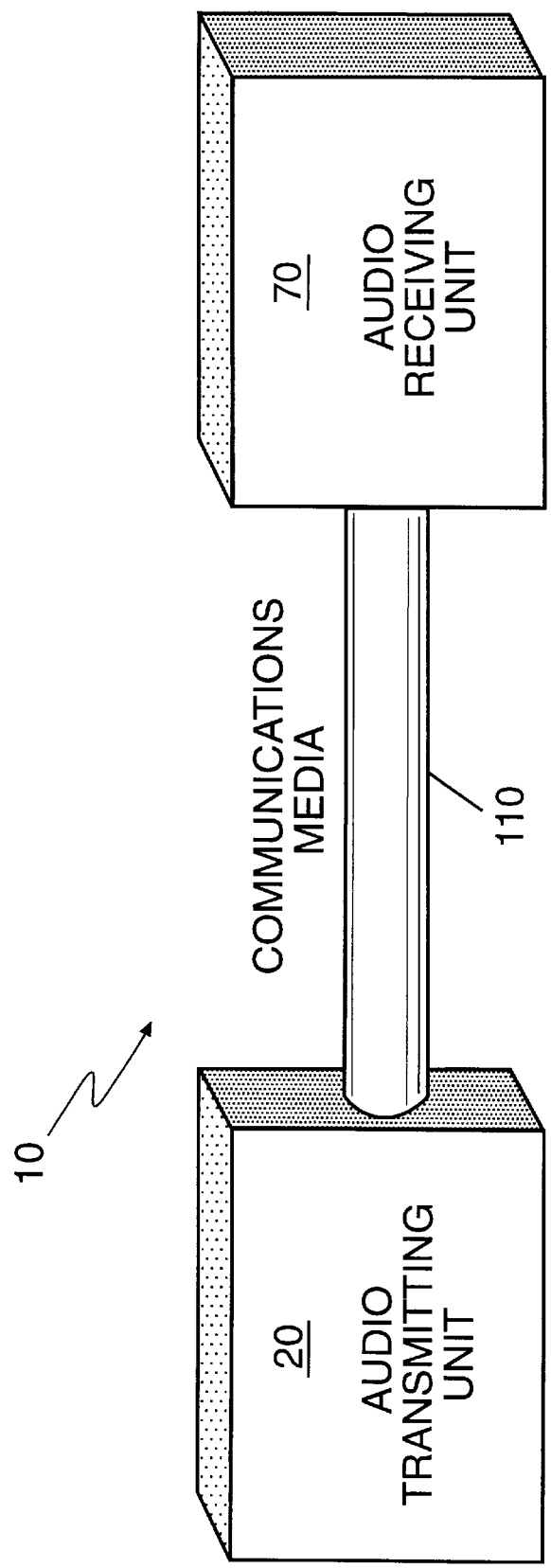
FIG. 1 is a general block diagram of the system configuration necessary for the implementation of the system and method of the present invention.

Referring now to the drawings, FIG. 1 shows the multi-resolution audio transmission system, indicated generally by the numeral 10. The basic elements of the multiresolution audio transmission system 10 are an audio transmitting unit generally numbered as 20, an audio receiving unit generally numbered as 70, and a communications media 110 providing a communications link between the audio transmitting unit 20 and the audio receiving unit 70.

Figure 2:
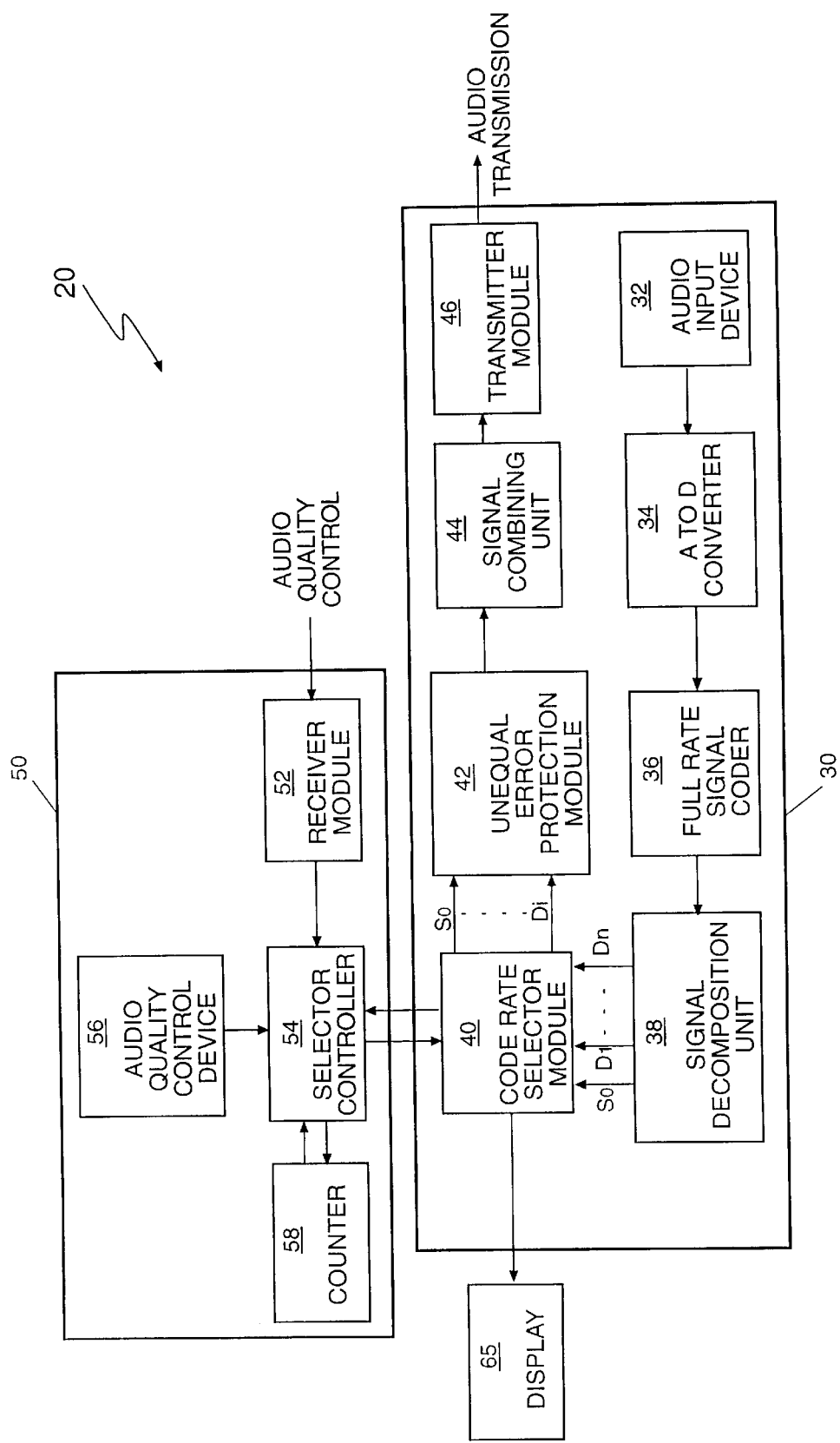
FIG. 2 is a block diagram of the audio transmitting unit of the system and methodology embodied by the present invention.

FIG. 2 shows the audio transmitting unit 20 in greater detail. The audio transmitting unit 20 basically comprises an audio processing unit 30, an audio quality control unit 50, and a display 65. The audio processing unit 30 digitally codes the audio input, decomposes the signal, selects the level of resolution, and encodes transmission rate and error protection parameters before the signal is transmitted to the audio receiving unit 70. The audio quality control unit 50 enables either the transmitting party or the receiving party to increase the level of the quality of the audio transmission. The level of audio quality or resolution used by the audio transmitting unit 20 for the audio transmission is indicated on the display 65.

The audio processing unit 30 includes an audio input device 32, an analog-to-digital converter 34, a full-rate signal coder 36, a signal decomposition unit 38, a code rate selector module 40, an unequal error protection module 42, a signal combining unit 44, and a transmitter module 46. An audio signal is input into the audio transmitting unit 20 via an audio input device 32. An audio input device 32 may include, for example, a microphone, a piezo-electric transducer, or an audio playback device such as a tape recorder or a compact disc player. The analog-to-digital converter 34 converts the voice signal to a digital form. The digital signal is then coded by the full-rate signal coder 36 to compress the signal. The output of the full-rate signal coder 36 is a standard 13 kbps audio signal. The output of the full-rate signal coder 36 is decomposed by the signal decomposition unit 38. The signal decomposition unit 38 decomposes the full rate audio signal into a low rate (coarse) base audio signal and discrete incremental levels of signal detail. The signal detail increases at each level such that the addition of levels to the base signal increases the resolution or quality of the resulting transmitted audio signal by adding detail and increasing the transmission rate. The full rate audio signal may be decomposed, for example, by using wavelet techniques or other pyramidal decomposition schemes. Such methods are well-known to those skilled in the art and therefore are not described herein. For a more detailed explanation of wavelet techniques, see S. G. Mallat, *A Theory for Multiresolution Signal Decomposition: The Wavelet Representation,* IEEE Transactions on Pattern Analysis and Machine Intelligence, vol. 11, no. 7, pp. 674–693 (July, 1989), which is incorporated herein by reference. The code rate selector module 40 determines which signals, $S_0, D_1, D_2, \ldots D_0$, to pass to the unequal error protection module 42 for channel coding. The signal combining unit 44 combines the base signal and/or signal details after channel coding. The transmitter module 46 is used to transmit the audio signal at a selected resolution to a remotely located audio receiving unit 70.

The audio quality control unit 50 controls the level of resolution transmitted by the audio transmitting unit 20. The audio quality control unit 50 includes a receiver module 52, a selector controller 54, a counter 56, and an local control device 58. The receiver module 52 receives and demodulates signal detail requests from the audio receiving unit 70. The selector controller 54 processes the transmission request and instructs the code rate selector module 40 to pass the appropriate detail signals based upon the request. The counter 56 maintains a count of the total number of details transmitted by the image transmitting unit 20. Incoming requests for transmission of additional signal details, also referred to herein as transmission requests, are directed through the receiver module 52. The code rate selector module 40 is then directed to increase the level of sound quality by adding the requested additional signal details to the existing signal. The resolution of the signal is increased since the addition of details includes a corresponding increase in the rate of signal transmission for each detail. In general, the higher the signal transmission rate, the higher the quality of the transmitted audio. At the same time that signal details are added, the counter module 56 is also updated to maintain count of the total levels of signal detail used for the audio transmission.

The level of resolution may also be incremented without first receiving a transmission request from the audio receiving unit 70. This would be accomplished by a local control device 58 incorporated into the audio transmitting unit 20 and controlled by a man-machine interface such as a keypad connected to the audio transmitting unit 20. In such instances, the user of the audio transmitting unit 20 could increase the resolution of the audio signal by adding signal details in response to a verbal request from the user of the audio receiving unit 70. The code rate selector 40 would then increase the resolution of the audio signal transmitted to the audio receiving unit 70 by adding signal details and increasing the transmission rate. In this situation, in order to maintain the resolution level indicated to both parties to the conversation, information coded with the transmitted audio signal would notify and/or update the counter 96 in the audio receiving unit 70 to the resolution level of the signal.

Figure 3:
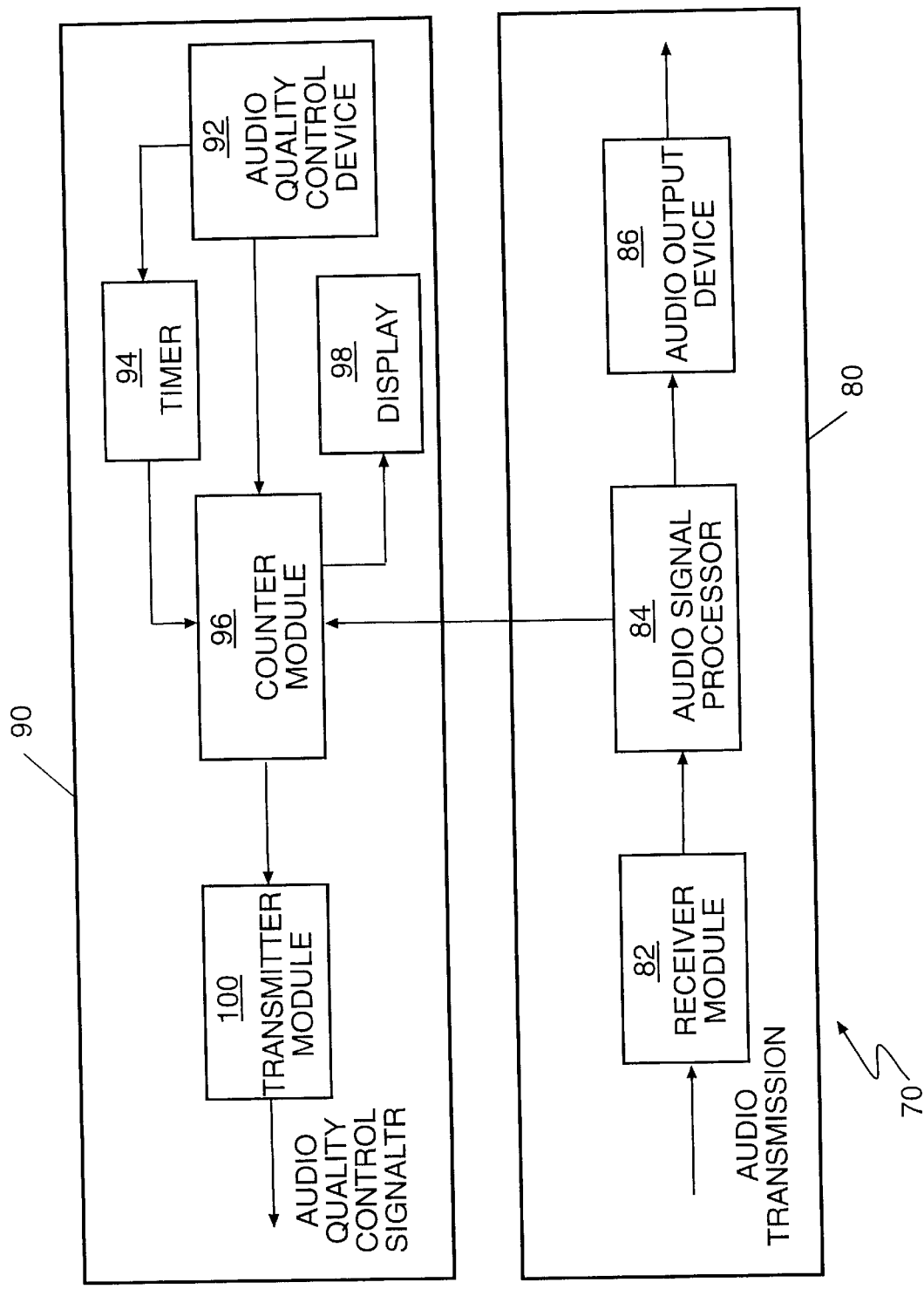
FIG. 3 is a block diagram of the audio receiving unit of the system and methodology embodied by the present invention.

The audio receiving unit 70, shown in FIG. 3, comprises a reception unit 80 and an audio quality adjusting unit 90. The reception unit 80 receives the audio signal and converts the signal to an audio output which is heard by the receiving party. The reception unit 80 includes a receiver module 82, an audio signal processor 84, and an audio output device 86. The received audio signal is demodulated by the receiver module 82. The demodulated signal is then decoded by the audio signal processor 84 and applied to the output device 86 to generate an audible signal.

The audio quality adjusting unit 90 allows the receiving party to make an initial request to the transmitting party to begin the audio transmission. It also enables the receiving party to send requests for signal details if the received sound quality is insufficient. The audio quality adjusting unit 90 includes a audio quality control device 92, a timer 94, a counter module 96, a display 98, and a transmitter module 100.

The audio quality control device 92 is used to increment the resolution of the audio signal. The audio quality control device 92 may, for example, comprise a pushbutton. Pushing the button 92 causes a transmission request to be sent via the transmitter module 100. The timer 94 is used to delay the transmission of any requests for signal details so that multiple presses of the button 92 can be accumulated and sent as a single request. The counter module 96 keeps a count of the number of transmission requests sent to the audio transmitting unit 20. The resolution level of the received audio signal is indicated on the display 98.

The communications media 110 illustrated in FIG. 1 comprises the means by which the audio transmitting unit 20 communicates with the audio receiving unit 70. While the means of communication is not unique to the present invention, it may comprise such methods as wireline, radio frequency, infrared, or microwave. Subclasses to the means of communication may be any channels which are dedicated for specific roles in the communication between the audio transmitting unit 20 and the audio receiving unit 70. In the present invention, a radio frequency means of communication is assumed.

To use the transmission system of the present invention, an audio signal S is first digitally coded and then decomposed using, for example, wavelet techniques into a base signal $S_0$ and a series of signal details $D_1, D_2, \ldots D_n$. The signal details $D_1, D_2, \ldots D_n$ can then be sequentially recombined with the base signal $S_0$, coded at a base transmission rate, $R_0$, to provide increasing levels of quality of the audio signal at increasing rates of signal transmission. For example, $S_0$ combined with $D_1$ would provide an audio signal of one resolution level above the base signal. This signal would have a corresponding audio signal transmission rate, $R_1$. Similarly, $S_0$ combined with $D_1$ and $D_2$ would provide a audio signal of two resolution levels above the base signal. This signal would have an audio signal transmission rate, $R_2$, where $R_2$ is greater than $R_1$. Following this concept, $S_0$ combined with $D_1, D_2, \ldots$ and $D_n$ would provide an audio signal with the highest available level of resolution corresponding to the original audio signal. Thus, accordingly, the highest level of resolution would be transmitted at the highest rate of transmission, R, corresponding to high fidelity audio.

Note that due to the hierarchical nature of the multiresolution transmission system 10, the base signal is the most important data in a multiresolution audio transmission. The importance of the base signal lies in that it is the foundation upon which subsequent signal details are added. As such, it is necessary to preserve the integrity of this data upon transmission. For the same reason, the lower levels of signal detail that are added to the base signal to improve the resolution are more important than the higher level fine signal details. Thus, in addition to assigning progressively faster signal transmission rates as the requested resolution increases, the multiresolution audio transmission system assigns varying error protection to the components of the signal based on the relative importance of those components. The base signal is assigned the most error protection and each signal detail from $D1 \ldots D_N$ is assigned a decreasing level of error protection. This process of assigning error protection to the components of the audio signal is termed unequal error protection and is encoded in each component of the audio signal prior to combining the components for transmission.

After the original audio signal is decomposed, the audio transmitting unit 20 determines the number of levels of the signal which will be transmitted to the audio receiving unit 70. When a transmission request is received from the audio receiving unit 70, the audio transmitting unit 20 responds by sending the requested level of the audio signal data. Usually, only the base signal is transmitted in response to the initial transmission request. This signal is most often an order of magnitude smaller than the original signal. The initial audio signal, however, may also comprise the base signal and one or more signal details. In such case, the base signal and the specified number of signal details are selected by the rate code selector module 40 prior to transmission.

If more detail is required, the recipient can send additional transmission requests (in real time) for more details. For each additional transmission request, the audio transmitting unit 20 responds by directing the code rate selector module 40 to increase the level of signal detail which is sent to the audio receiving unit 70. Thus, after the original audio signal is decomposed at the signal decomposition unit 38, the full resolution of the signal (the base signal and all detail levels up to the maximum level of decomposition) are available for transmission to the audio receiving unit 70. Subsequently, the code rate selector module 40 acts as a "valve" which allows only the requested level of signal detail to pass through for transmission. When additional signal details are requested, the "valve" opens further to allow more signal details to pass through. Furthermore, as the level of detail increases, the rate of signal transmission also increases. The result is improved resolution of the audio signal. After the levels of detail are determined, unequal error protection is assigned to each level of the signal. However, prior to transmission, the audio signal details are recombined with the base signal and any previously added signal details such that a unified signal is transmitted. If a request for multiple signal details is received by the audio transmitting unit 20, the corresponding number of signal details are added to the existing level of resolution, allowing a higher quality signal to be transmitted.

Note that the user of the audio transmitting unit 20 may be able to designate specific audio receiving units 70 which would be able to receive multiresolution audio signals. In practice, an example of this imposed limitation in a radio-telephone communication system would be where the user of the audio transmitting unit 20 programs certain authorized telephone numbers into the device. As a result, only callers from those specific telephone numbers with audio receiving units 70 would have full multiresolution audio signal reception capability. Callers from numbers other than those specifically authorized by the user of the audio transmitting unit 20 would receive either no audio signal or an audio signal at a preset level of resolution. Here, the blocking of all audio signal transmission would comprise a security feature to prevent reception of audio signals by unauthorized parties. The transmission of only the marginally usable base signal to unauthorized numbers may also have a similar security effect. On the other hand, transmission of any higher level of resolution, such as the base signal combined with a number of signal details, may also be set by the user of the audio transmitting unit 20 in order to limit the transmission resolution. The user of the audio transmitting unit 20 may determine that an intermediate level of resolution is all that the receiving party needs and transmit only that level. Therefore, these features will assist both in the security and in the optimization of bandwidth and power parameters of audio transmission.

Figure 4:
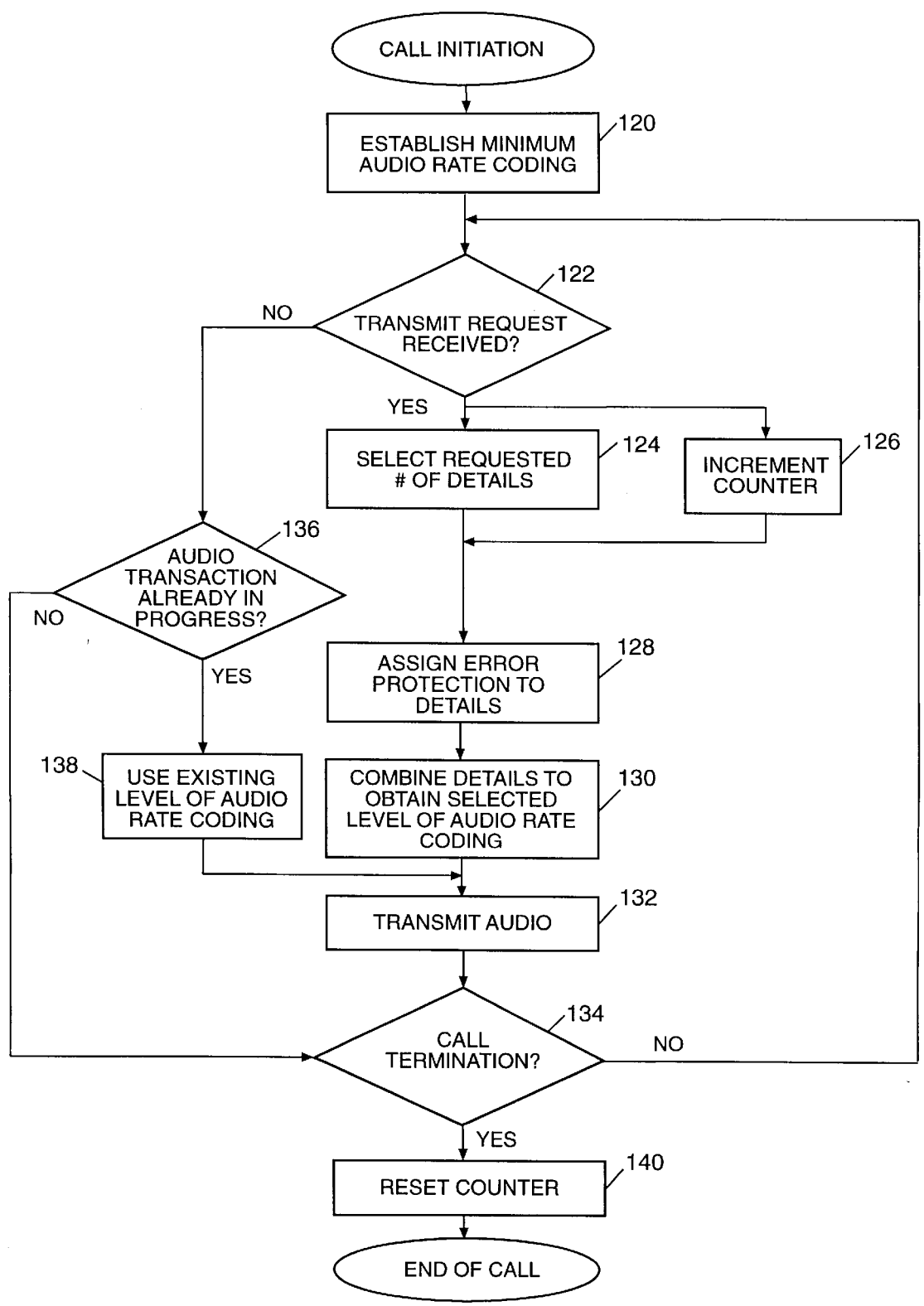
FIG. 4 is a flow diagram illustrating the operation of the audio transmitting unit of the present invention.
Figure 5:
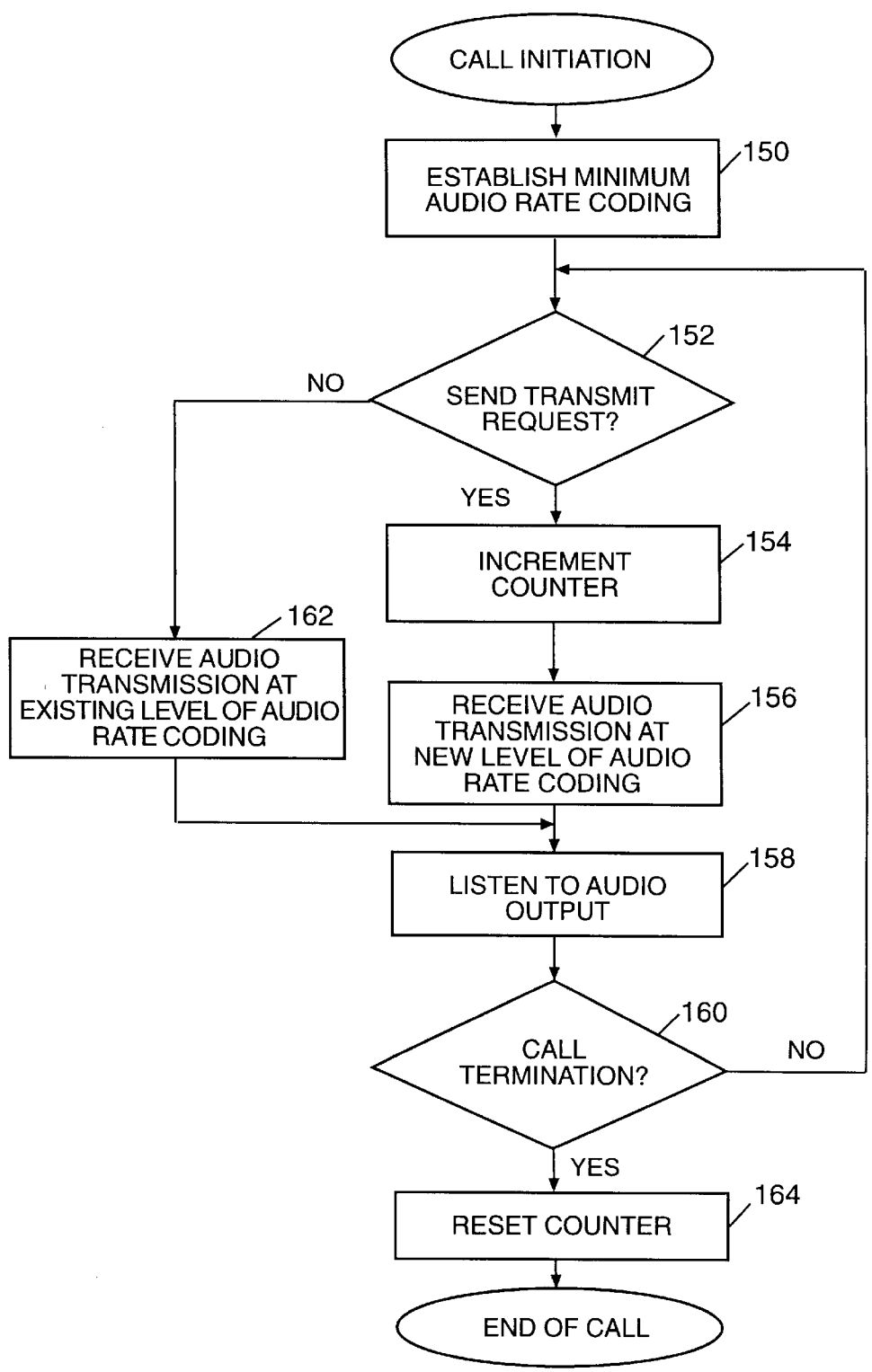
FIG. 5 is a flow diagram illustrating the operation of the audio receiving unit of the present invention.

Referring now to FIGS. 4 and 5, the operations of the audio transmitting unit 20 and audio receiving unit 70 are shown in greater detail. During the call initiation, each party to the communication establishes the initial level of resolution to be transmitted, such as $S_0$ or $S_0$ combined with $D_1$, etc. The step of establishing the minimum level of resolution is indicated by function block 120 (FIG. 4) for the audio transmitting unit 20 and function block 150 (FIG. 5) for the audio receiving unit 70. Typically, this level would be preset in both the audio transmitting unit 20 and the audio receiving unit 70 by the respective user. If the level specified by each party is different, the minimum of the two values would be the limiting initial parameter.

In addition to setting a minimum level of resolution, the transmitting party may also be able to specify the maximum level of resolution available to the receiving party. The maximum level of resolution set by the transmitting party may be less than the resolution of the original audio signal when initially input into the system. For instance, the audio signal may have originally been decomposed into a base signal and seven additional signal details. The transmitting party could limit the maximum available resolution to four additional signal details. Accordingly, the receiving party would only be able to receive a maximum resolution of the base signal with four additional signal details, not the full resolution of the original signal. This feature is useful where the transmitting party bears the cost of the communication and seeks to limit the air time required for the audio transmission.

After the minimum level of resolution has been established, audio transmission starts when a transmission request is sent from the audio receiving unit 70 to the audio transmitting unit 20 via a dedicated control channel DCC such as the fast associated control channel (FACCH) or the slow associated control channel (SACCH). Note that a dedicated control channel DCC may be utilized for the transmission request since no audio signal is sent.

As previously described, the analog audio signal input through the audio input device 32 is converted to a digital signal by the analog-to-digital converter 34. The single digital signal is then coded by the full rate signal coder 36 at the full transmission block 126) to ensure that the number of signal details requested by the audio receiving unit 70 does not exceed the maximum level available for the audio signal.

When the requested level of resolution has been selected by the code rate selector module 40, the base signal and any signal details comprising the request are each coded with error protection at the unequal error protection module 42 (function block 128). The base signal and the selected signal details are then combined by the signal combining unit 44 (function block 130) into a single audio signal. Since the base signal and the signal details each include different transmission rates, the combination of these elements produces a cumulative transmission rate for the signal. The audio signal is then transmitted to the audio receiving unit 70 via the transmitter module 46 (function block 132).

After transmission of the audio signal, the transmitting party may terminate the call (decision block 134). If the call is not terminated, the receiving party may send requests for additional signal detail (decision block 122). As before, if a request for additional signal detail is received, the resolution of the previous audio signal is increased accordingly prior to transmission. However, if no request for additional signal detail is received by the audio transmitting unit 20, the existing level of resolution is used for the remainder of the communication between the two parties (decision block 136 and function block 138). When the parties terminate the communication (decision block 134), the counter 60 is reset (function block 140) before the call is ended.

Referring now to FIG. 5, the operation of the audio receiving unit 70 is shown. The audio transmission process begins when the audio receiving unit 70 sends a rate available for the particular audio transmission system in use. At this point, the signal is decomposed by the signal decomposition unit 38 into a base signal and a number of signal details. The number of signal details resulting from the decomposition of the original signal is called the maximum level of decomposition. The maximum level of decomposition is determined by the computational complexity of the audio transmitting unit 20 or it may be artificially limited by the transmitting party. Once decomposed, the components of the original audio signal are selectively transmitted to the audio receiving unit 70 as described herein.

Referring now to FIG. 4, the operation of the audio transmitting unit 20 is shown. When a transmission request is received by the audio transmitting unit 20 (decision block 122), the audio transmitting unit 20 adjusts the resolution of the audio signal by selecting the appropriate levels of detail. As generally indicated by function block 124, when the first transmission request is received, the audio transmitting unit 20 directs the code rate selector 40 to select the base signal for transmission to the audio receiving unit 70. Thereafter, the audio transmitting unit 20 directs the code rate selector 40 to select the next level of signal detail for addition to the base signal in response to each transmission request. If a request for multiple details is received, the audio transmitting unit 20 directs the code rate selector 40 to select that number of details for addition to the previous level of resolution over the base signal (function block 124). As indicated by function block 126, each time a transmission request for audio signal data is received, the counter module 60 increments the count (function transmission request to the audio transmitting unit 20 (decision block 152). The counter module 96 is then incremented to take count of the number of audio signal details requested (function block 154). After the audio receiving unit 70 receives the audio transmission from the audio transmitting unit 20 at the requested resolution level (function block 156), the receiving party listens to the audio output from the audio output device 86 to determine if the sound quality is acceptable.

After reception of an audio signal, the receiving party may opt to terminate the call (decision block 160). If the call is not terminated and if the receiving party is not satisfied with the resolution or the quality of the sound after reception of the initial audio signal $S_1$, the audio resolution may be increased by pressing the button 92 the number of times corresponding to the number of additional signal detail levels desired. Activation of the button 92 (decision block 152) leads to three events: the timer 94 is activated, an increment corresponding to the extent of activation of the button 92 is registered by the counter module 96 (function block 154), and the total resolution level is indicated on the display 98. After the specified time-out, the timer 94 commands the counter module 96 to send a request for additional signal details to the audio transmitting unit 20 corresponding to the increment registered by the counter module 96. For example, if the button 92 is pressed 2 times, a request for two additional signal details is sent via the dedicated control channel DCC. Similarly, if the receiving party had activated the button 92 three times, the audio transmitting unit 20 would be requested to add three additional signal details to the existing level of audio resolution transmitted to the audio receiving unit 70.

The process of incrementally tuning the resolution of the audio signal continues as specified in the preceding paragraph until the receiving party is satisfied with the resolution of the audio output or until the maximum number of signal details has been reached. If no additional requests for signal details is sent by the receiving party (decision block 152), the communication between the parties continues at the existing level of resolution (function block 162). On termination of the communication (decision block 160), the counter 96 is reset prior to the end of the call (function block 164).

The described method for transmitting multiresolution audio signals illustrates the increased level of efficiency which may be realized by enabling the parties to a communication to determine the optimal level of resolution or sound quality. This method would result in significantly more efficient transmission of sound, especially if the highest level of resolution is not required for the user's needs. Therefore, when applied to radio frequency communications, this method would serve to increase the efficiency of audio communication by reducing bandwidth requirements and power consumption.

The present invention may, of course, be carried out in other specific ways than those herein set forth without parting from the spirit and essential character of the invention. The present embodiments are, therefore, to be considered in all respects as illustrative and not restrictive, and all changes coming within the meaning and equivalency range of the appended Claims are intended to be embraced therein.

What is claimed is:

1. A method for transmitting multiresolution audio signals comprising:
   a) coding an audio input signal to produce a full-rate speech signal;
   b) decomposing the full-rate speech signal into a base signal having a predetermined minimum resolution and one or more signal details which, when recombined with the base signal, incrementally increase the level of resolution of the audio signal from a minimum resolution up to a maximum resolution;
   c) inputting the base signal and signal details into a code rate selector;
   d) selecting a resolution level for a transmission;
   e) outputting from the code rate selector the base signal and selected signal details corresponding to the selected resolution level;
   f) transmitting the base signal and selected signal details corresponding to the selected resolution to said audio receiving unit; and
   g) combining the selected signal details with the base signal to form an audio signal of the selected resolution.

2. A method for transmitting multiresolution audio signals comprising:
   a) decomposing the audio signal into a base signal having a predetermined minimum resolution and one or more signal details which, when recombined with the base signal, incrementally increase the level of resolution of the audio signal from a minimum resolution up to a maximum resolution;
   b) inputting the base signal and signal details into a code rate selector;
   c) selecting a resolution level for a transmission;
   d) outputting from the code rate selector the base signal and selected signal details corresponding to the selected resolution level;
   e) transmitting the base signal and selected signal details corresponding to the selected resolution to said audio receiving unit; and
   f) combining the selected signal details with the base signal to form an audio signal of the selected resolution.

3. The method of claim 1 further wherein the base signal and said signal details are combined to generate said audio signal prior to transmitting said signals to said audio receiving unit.

4. The method according to claim 2 wherein the step of selecting the resolution level comprises sending a multiple signal detail request to said audio transmitting unit and adding multiple signal details to said audio signal to increase the resolution by multiple levels.

5. The method according to claim 2 wherein the signal detail requests originate from the audio receiving unit.

6. The method of claim 1 wherein the step of selecting the resolution level of the transmission comprises sending a signal detail request to said audio receiving unit and adding at least one additional signal detail to said audio signal to increase the level of resolution incrementally each time a signal detail request is received by said audio transmitting unit.

7. The method according to claim 1 including the step of displaying the resolution of the audio signal being transmitted on a display at the audio receiving unit.

8. The method according to claim 1 including the step of indicating at said audio transmitting unit the resolution of the audio signal being transmitted to said audio receiving unit.

9. The method according to claim 1 further including the step of limiting the resolution of the audio signal to a level less than the maximum resolution.

10. The method according to claim 1 including the step of error coding the base signal and each of the selected signal details using a heirarchical coding scheme wherein varying levels of error protection are used for said base signal and said signal details.

11. A method for transmitting an audio signal between an audio transmitting unit and an audio receiving unit, comprising:
   a) decomposing the audio signal into a base signal having a predetermined minimum resolution and one or more signal details which, when recombined with the base signal, incrementally increase the level of resolution of the audio signal from a minimum resolution up to a maximum level of resolution;
   b) inputting the base signal and signal details into a code rate selector;
   c) selecting a first resolution level for transmitting said audio signal;
   d) outputting from the code rate selector the base signal and selected signal details corresponding to the first resolution level;
   e) transmitting the audio signal at said first level of resolution to said audio receiving unit;
   f) sending a request from said audio receiving unit to said audio transmitting unit to increase the resolution of the transmitted audio signal to a second resolution level;
   g) outputting from the code rate selector the base signal and selected signal details corresponding to the second resolution level in response to said request; and
   h) transmitting said audio signal at said second level of resolution to said audio receiving unit.

12. The method of claim 11 wherein said audio signal at said first resolution includes only said base signal.

13. The method of claim 11 wherein said audio signal at said first resolution includes said base signal and at least one signal detail.

14. The method according to claim 11 including the step of error coding the base signal and each of the selected signal details using a heirarchical coding scheme wherein varying levels of error protection are used for said base signal and said signal details.

15. The method according to claim 11 wherein the step of sending a signal detail request comprises sending a multiple signal detail request to increase the resolution of the audio signal by multiple levels.

16. A multiresolution audio signal transmission system comprising:
   a) signal decomposition means for decomposing an audio signal into a base signal and one or more signal details which can be sequentially combined with said base signal to create audio signals of increasingly higher resolution;
   b) quality control means for selecting a resolution level for transmitting said audio signal;
   c) a code rate selector connected to the output of said signal decomposition unit and responsive to said quality control means for selecting the base signal and signal details corresponding to the selected resolution level for transmission to an audio receiving unit;

c) transmitting means operatively connected to said code rate selector for transmitting the base signal and selected signal details output from the code rate selector; and d) signal combining means for combining said base signal with said selected signal details to create audio signals of increasingly higher resolution with the addition of each signal detail.

17. The multi-resolution audio transmitting system of claim 16 wherein said selecting means includes a requesting means for generating a request signal.

18. The multi-resolution audio transmitting system of claim 17 wherein said requesting means includes a push button and wherein said requesting means is responsive to the actuation of the push button to generate said request signal.

19. The multi-resolution audio transmitting system of claim 18 wherein said push button is located remotely from said transmitting module, and wherein said transmitting system includes a receiver for receiving request signals transmitted from said remote location.

20. The multiresolution audio transmission system according to claim 16 wherein said processing means in said audio transmitting unit includes an heirarchical error protection module for error coding the base signal and each of the selected signal details, wherein the error protection module provides a varying degree of error protection to said base signal and said signal detail.

* * * * *